(12) United States Patent
Ajami et al.

(10) Patent No.: US 12,389,324 B2
(45) Date of Patent: Aug. 12, 2025

(54) SYNCHRONIZATION OF TARGET WAKEUP TIMES

(71) Applicant: QUALCOMM Incorporated, San Diego, CA (US)

(72) Inventors: Abdel Karim Ajami, Lakeside, CA (US); Sai Yiu Duncan Ho, San Diego, CA (US); Alfred Asterjadhi, San Diego, CA (US); George Cherian, San Diego, CA (US); Abhishek Pramod Patil, San Diego, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/810,177

(22) Filed: Jun. 30, 2022

(65) Prior Publication Data

US 2024/0007948 A1    Jan. 4, 2024

(51) Int. Cl.
*H04W 52/02* (2009.01)
(52) U.S. Cl.
CPC .............................. *H04W 52/0216* (2013.01)
(58) Field of Classification Search
None
See application file for complete search history.

(56) References Cited

U.S. PATENT DOCUMENTS

| 2016/0219522 | A1 | 7/2016 | Asterjadhi et al. | |
|---|---|---|---|---|
| 2022/0201533 | A1* | 6/2022 | Sehgal | H04W 52/0216 |
| 2022/0201606 | A1* | 6/2022 | Shafin | H04W 52/0216 |
| 2022/0361194 | A1* | 11/2022 | Shafin | H04W 72/535 |
| 2023/0128915 | A1* | 4/2023 | Kim | H04L 1/1896 370/329 |
| 2023/0403704 | A1* | 12/2023 | Park | H04W 72/23 |
| 2024/0137982 | A1* | 4/2024 | Chu | H04W 74/0816 |
| 2024/0188069 | A1* | 6/2024 | Viger | H04W 72/1221 |
| 2024/0214858 | A1* | 6/2024 | Choi | H04W 52/0251 |
| 2024/0324014 | A1* | 9/2024 | Baek | H04W 28/02 |
| 2024/0334487 | A1* | 10/2024 | Yang | H04W 74/08 |

FOREIGN PATENT DOCUMENTS

WO    2018047610 A1    3/2018

OTHER PUBLICATIONS

Co-pending U.S. Appl. No. 17/516,375, inventor Ajami; Abdel Karim, filed Nov. 1, 2021.
International Search Report and Written Opinion—PCT/US2023/024314—ISA/EPO—Sep. 29, 2023.

* cited by examiner

*Primary Examiner* — German Viana Di Prisco
(74) *Attorney, Agent, or Firm* — Arun Swain

(57) ABSTRACT

Certain aspects of the present disclosure provide techniques for wireless communication at a station, generally including obtaining signaling indicating a resolution of a target wake time (TWT) field, determining a start time of a TWT service period (SP) based on the indicated resolution, and taking action based on the determined start time of the TWT SP.

28 Claims, 15 Drawing Sheets

| TWT field size | Bit S | Bit E | Min Target Wake Time | Max Target Wake Time |
|---|---|---|---|---|
| 2 octets | 0 | 15 | 0 μsecs | 65.535 msec |
| 2 octets | 1 | 16 | 2 μsecs | 131.071 msec |
| 2 octets | 2 | 17 | 4 μsecs | 262.143 msec |
| 2 octets | 3 | 18 | 8 μsecs | 524.287 msec |
| 2 octets | 4 | 19 | 16 μsecs | 1.048575 secs |
| 2 octets | 10 | 25 | 1024 μsecs | 33.554431 secs |
| 3 octets | 0 | 23 | 0 μsecs | 16.777215 secs |
| 3 octets | 1 | 24 | 2 μsecs | 33.554431 secs |
| 3 octets | 2 | 17 | 4 μsecs | 67.108863 secs |

Current Encoding (rows 1–6)

Proposed Encoding (rows 7–9)

SYNCHRONIZATION OF TARGET WAKEUP TIMES

BACKGROUND

Field of the Disclosure

Aspects of the present disclosure relate to wireless communications, and more particularly, to techniques for synchronization of target wake up times (TWTs).

Description of Related Art

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

One aspect provides a method of wireless communications at a station. The method includes obtaining signaling indicating a resolution of a target wake time (TWT) field; determining a start time of a TWT service period (SP) based on the indicated resolution; and taking action based on the determined start time of the TWT SP.

Another aspect provides a method of wireless communication at an access point (AP). The method includes outputting, for transmission, signaling indicating a resolution of a TWT field; and determining a start time of a TWT SP based on the indicated resolution.

Other aspects provide: an apparatus operable, configured, or otherwise adapted to perform any one or more of the aforementioned methods and/or those described elsewhere herein; a non-transitory, computer-readable media comprising instructions (e.g., processor-executable instructions) that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 10 is a table illustrating an encoding scheme for specifying resolution of TWTs, in accordance with certain aspects of the present disclosure.

DETAILED DESCRIPTION

Figure 1:
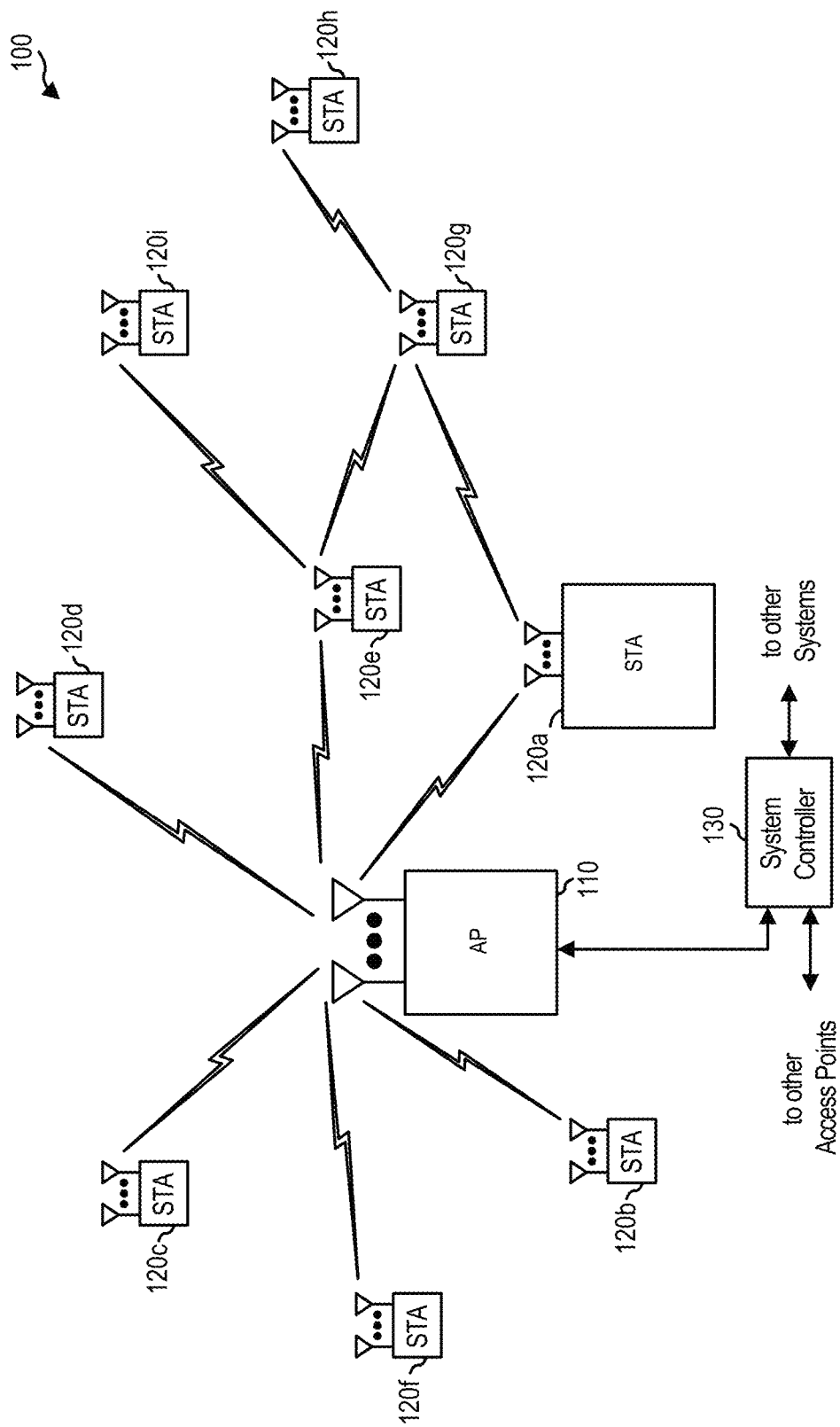
FIG. 1 depicts an example wireless communications network.

Aspects of the present disclosure provide apparatuses, methods, processing systems, and computer-readable mediums for synchronization of target wake up times.

In wireless communications systems, a Target Wake Time (TWT) generally refers to a mechanism that may help reduce power consumption and improve resource efficiency by enabling wireless stations to stay in a low power state and wake at specified times (TWTs) in order to send or receive data. TWTs can help an AP coordinate access to a wireless medium by different stations (STAs), allowing high quality of service with reduced contention or overlap and increased device sleep time to reduce power consumption and extend battery life. A mechanism referred to as a Restricted TWT (r-TWT) extends TWT signaling and functionality, potentially providing predictable latency for latency sensitive traffic for applications such as extended reality (XR) and Cloud Gaming (CG). r-TWT rules generally restrict access to the medium during an r-TWT service period (SP) by requiring that a STA end its transmit opportunity (TXOP) before the start time of an r-TWT SP. This allows members of the r-TWT SP to access the medium timely and deliver the latency sensitive traffic.

One potential imitation of the r-TWT mechanism, however, is that the finest granularity of r-TWT SP start time that it can support is one (1024 µsec) time unit (TU). As will be shown below, this resolution may be insufficient to adequately align r-TWT SPs with latency sensitive traffic (e.g., XR and CG traffic), as burst arrival rates are typically defined in frames per seconds (fps), such as 60 fps which would require a much finer resolution (e.g., 1 µsec). This potentially results in a mismatch between the XR/CG burst arrival and the r-TWT SP (e.g., of up to several msecs), which may significantly impact the latency performance of latency sensitive traffic.

Aspects of the present disclosure, however, provide various mechanisms for specifying TWT SP (e.g., r-TWT SP) start times with finer granularity. In some cases, the granularity may be indicated to a station, providing additional flexibility in adapting TWT-SP start times to expected traffic arrival times. As a result, the techniques described herein may help reduce or eliminate mismatch between traffic arrival and r-TWT SPs, which may significantly improve latency performance.

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communications System

FIG. 1 is a diagram illustrating an example wireless communication system 100, in accordance with certain aspects of the present disclosure. System 100 may be a multiple-input multiple-output (MIMO)/multi-link operation (MHLO) system 100. As shown in FIG. 1, an access point (AP) 110 includes an association manager 112 that may be configured to take one or more actions described herein. The wireless station (STA) 120a includes an association manager 122 that may be configured to take one or more actions described herein. In aspects, AP 110 and wireless station 120a may be MLDs as further described herein with respect to FIG. 3.

For simplicity, only one AP 110 is shown in FIG. 1. An AP is generally a fixed station that communicates with the wireless STAs and may also be referred to as a base station (BS) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
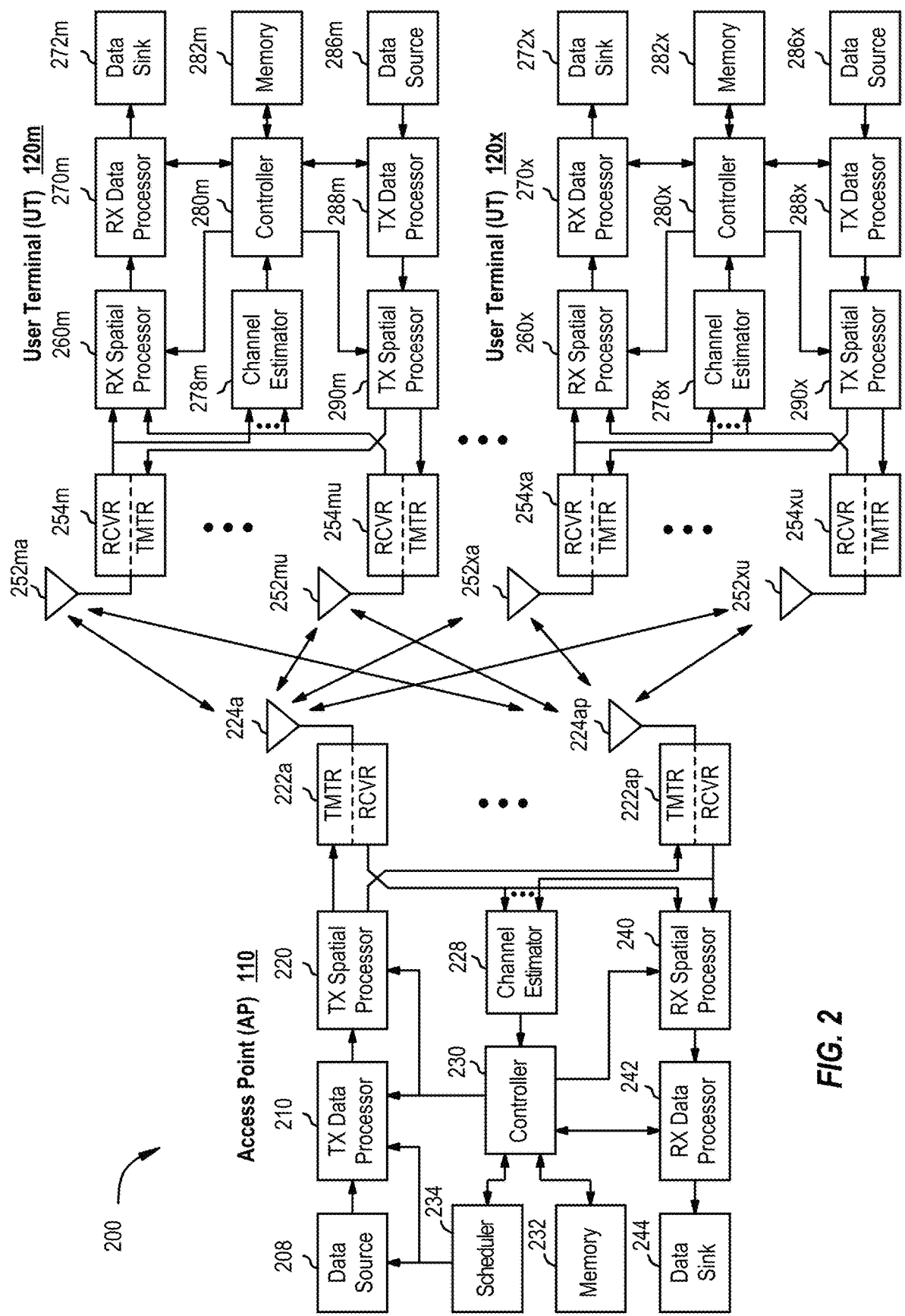
FIG. 2 depicts an example disaggregated base station architecture.

FIG. 2 illustrates a block diagram of AP 110 and two wireless STAs 120m and 120x in a MIMO/MLO system, such as system 100, in accordance with certain aspects of the present disclosure. In certain aspects, AP 110 and/or wireless STAs 120m and 120x may perform various techniques to ensure that a non-AP MLD is able to receive a group addressed frame. For example, AP 110 and/or wireless STAs 120m and 120x may include a respective association manager as described herein with respect to FIG. 1.

AP 110 is equipped with $N_{ap}$ antennas 224a through 224t. Wireless STA 120m is equipped with $N_{sta,m}$ antennas 252ma through 252mu, and wireless STA 120x is equipped with $N_{sta,x}$ antennas 252xa through 252xu. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to the AP 110.

At AP 110, $N_{ap}$ antennas 224a through 224ap receive the UL signals from all $N_{UL}$ wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Aspects Related to Synchronization of Target Wake Up Times

Restricted TWTs (r-TWTs) potentially provide predictable latency for latency sensitive traffic, such as extended reality (XR) and Cloud Gaming (CG) traffic, by restricting access to the medium during an r-TWT service period (SP). General r-TWT SP rules require that a STA end its transmit opportunity (TXOP) before the start time of an r-TWT SP. This allows members of the r-TWT SP to access the medium timely and deliver the latency sensitive traffic.

Figure 3:
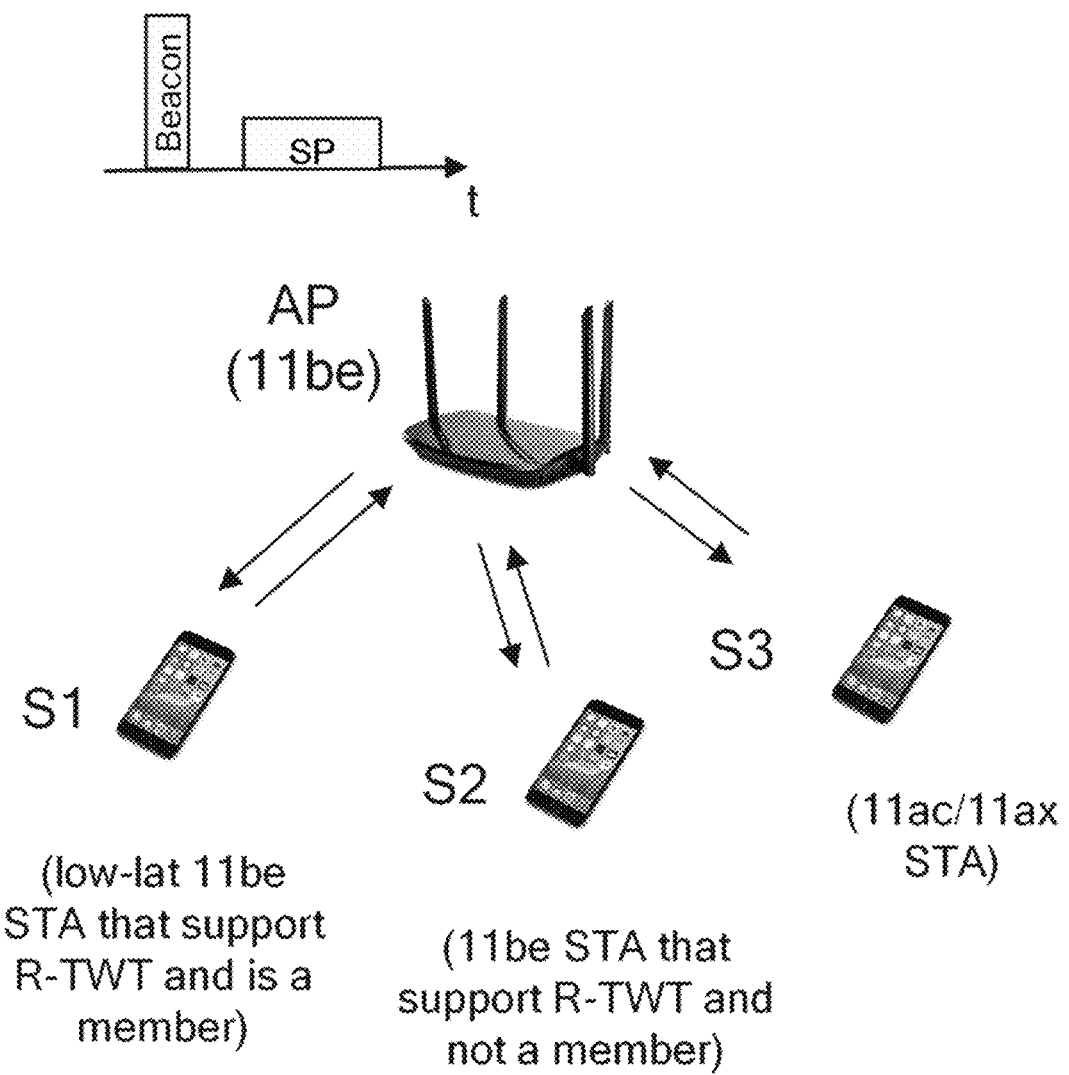
FIG. 3 and FIG. 4 depict example communications between an access point (AP) and wireless stations (STAs).

The r-TWT mechanism may be understood with reference to the example scenario shown in FIG. 3, in which an access point (AP) communicates with several stations (STAs) S1, S2, and S3. The example assumes that the AP (e.g., an 802.11 be AP) supports r-TWT, S1 (e.g., a low latency 802.11 be STA) supports r-TWT and is a member of an r-TWT group (meaning it may be able to access during an r-TWT SP), that S2 (e.g., an 802.11 be STA) supports r-TWT but is not a member of the r-TWT group, while S3 (e.g., an 802.11 ac/ax STA) does not support r-TWT. As illustrated in FIG. 3, the AP may transmit a beacon indicating an r-TWT service period (SP).

Figure 4:
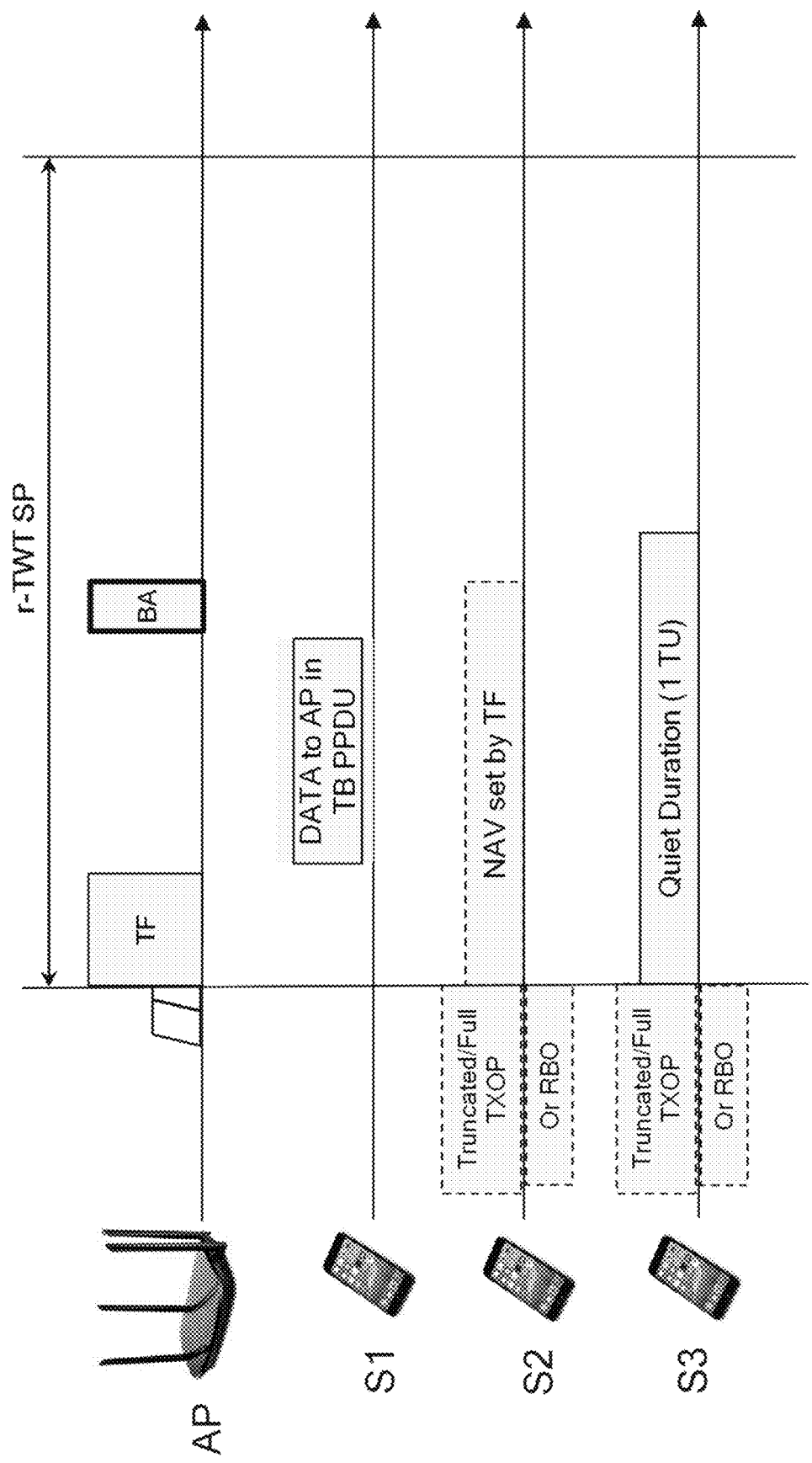

As shown in FIG. 4, S2 and S3 may be configured to end their TXOPs early, before the start time of the r-TWT SP so that S1 can access the channel timely and deliver latency-sensitive traffic. That is, these STAs (S2 and S3) may truncate the TXOP. Some other STAs (e.g., pre-11be STAs such as the STAs S3) may set a network allocation vector (NAV) duration at the beginning of an r-TWT SP based on a quiet element for a duration of one time unit (TU), which may be scheduled by the AP in a beacon.

Figure 5:
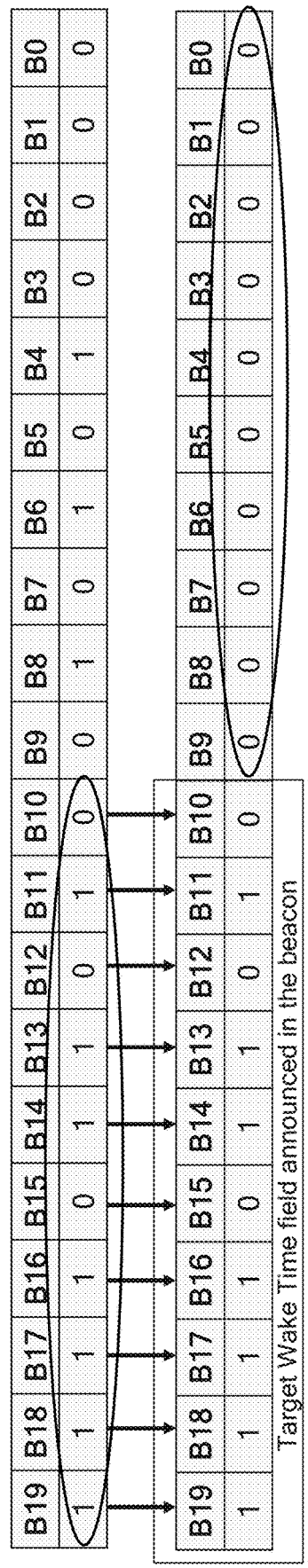
FIG. 5 depicts an example mapping of a Target Wake Time (TWT) field to a time synchronization function (TSF).

As noted above, resolution mismatch may occur between a target wakeup time (TWT) field and a corresponding time synchronization function (TSF). As illustrated in FIG. 5, for r-TWT, the TWT field (e.g., used to determine an r-TWT SP start time) in the TWT information element (IE) may be included in the TWT setup frame or announced in the beacon. As shown in the mapping illustrated in FIG. 5, the TWT IE is two octets with bit 0 of the two octets corresponding to (mapping to) bit 10 of the relevant TSF value. Thus, the relevant TSF for TWT is: $(1010000)_{10}$ μs= $(1110110100101010000)_2$.

Figure 6:
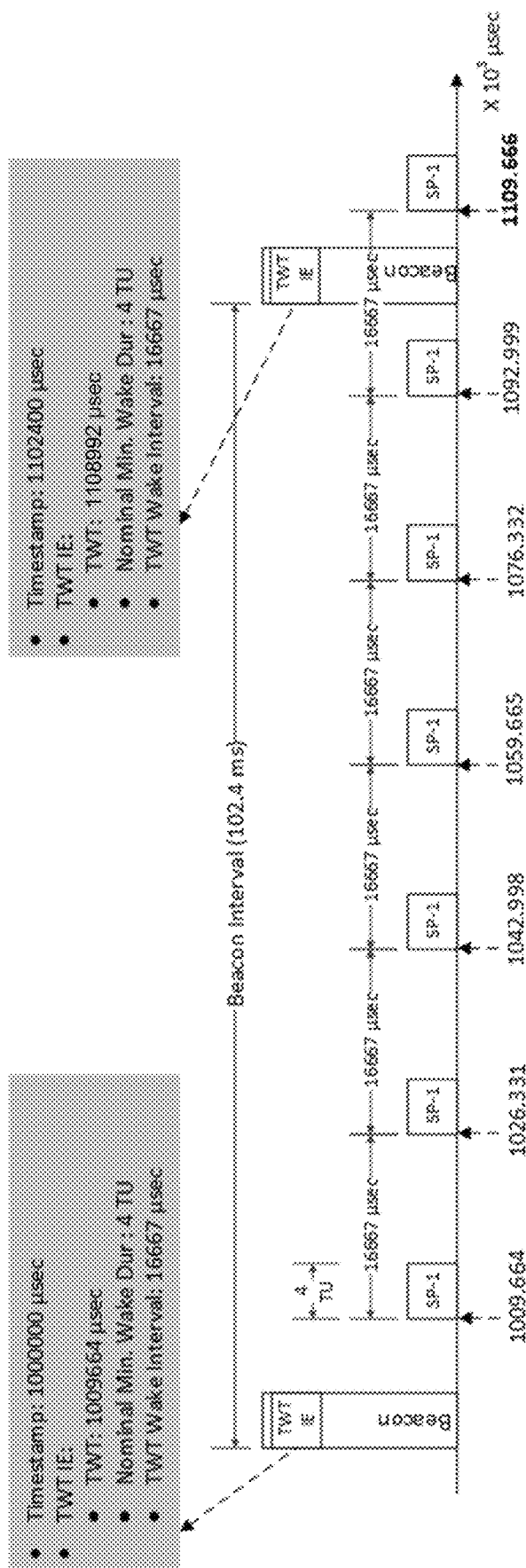
FIG. 6 depicts an example of mismatch between TWT Wake Interval and a subsequent beacon TWT announcement.

Because bit 0 of the TWT field maps to bit 10 of the relevant TSF, the minimum resolution is 1024 microseconds $(2^{10})$. Therefore, if the TWT wake interval is not set to multiples of 1024 μs, then when the AP announces in the TWT element of the next beacon frame, the TWT Wake Interval will not be able to express values of the corresponding TWT start time that are less than 1024 μs. As illustrated in FIG. 6, this leads to a mismatch between a negotiated r-TWT SP start time and an announced r-TWT SP start time in the following beacon intervals. FIG. 6 illustrates an example of this mismatch between TWT Wake Interval and a subsequent beacon TWT announcement.

In the example in FIG. 6, a first beacon is sent at a first time (time stamp 1000000 μsec) that indicates a TWT of 1009664 μsec for a TWT SP with a duration of 4 TU and a TWT wake interval of 16667 μsec. As noted above, the TWT Wake Interval generally needs to be set as multiple of 1024 μsec to avoid difference between negotiated and announced R-TWT SP start time. Thus, while a subsequent TWT would ideally be set to 1109666 μsec to align with a burst of traffic, the closest multiple of 1024 μsec to this is 11008992 μsec, resulting in a mismatch between the TWT wake interval and XR/CG traffic arrival. r-TWT defines periodicity (TWT wake interval) of an r-TWT SP using the TWT Wake Interval Mantissa, which comprises two octets, and the TWT Wake Interval Exponent, which comprises five bits. The TWT Wake Interval Mantissa subfield is two octets and is set to the value of the mantissa of the TWT wake interval value in units of microseconds, base two. The TWT Wake Interval Exponent subfield is five bits and is set to the value of the exponent of the TWT wake interval value in units of microseconds, base two. The TWT wake interval of the requesting STA is equal to (TWT Wake Interval Mantissa)× $2^{\wedge}$(TWT Wake Interval Exponent).

Figure 7:
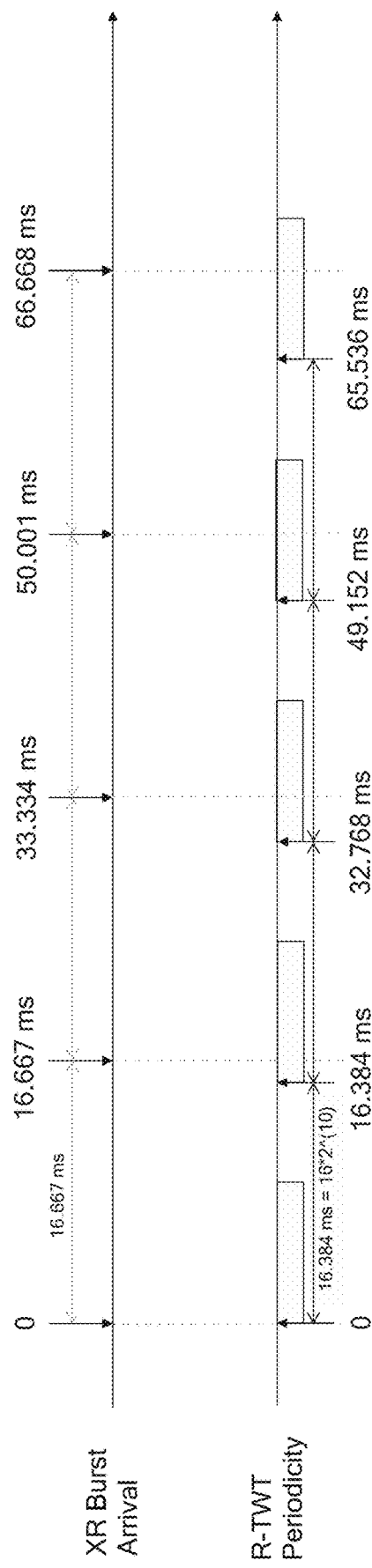
FIG. 7 depicts an example of mismatch between burst arrivals of latency-sensitive traffic and a TWT service period (SP).

As noted above (and illustrated in FIG. 7), the XR/CG burst arrival rate is typically defined in fps (e.g., 60 fps such that a burst arrives every 16.667 ms), which requires 1 μs granularity. However, as explained above, the finest granularity of periodicity that r-TWT can support is one TU (e.g., 1024 μs). As illustrated in FIG. 7, this results in a mismatch between the XR/CG burst arrival and the r-TWT SP. In some cases, the mismatch may grow to up to several milliseconds with subsequent TWT SPs, which may hurt the latency performance of latency-sensitive traffic.

Figure 8:
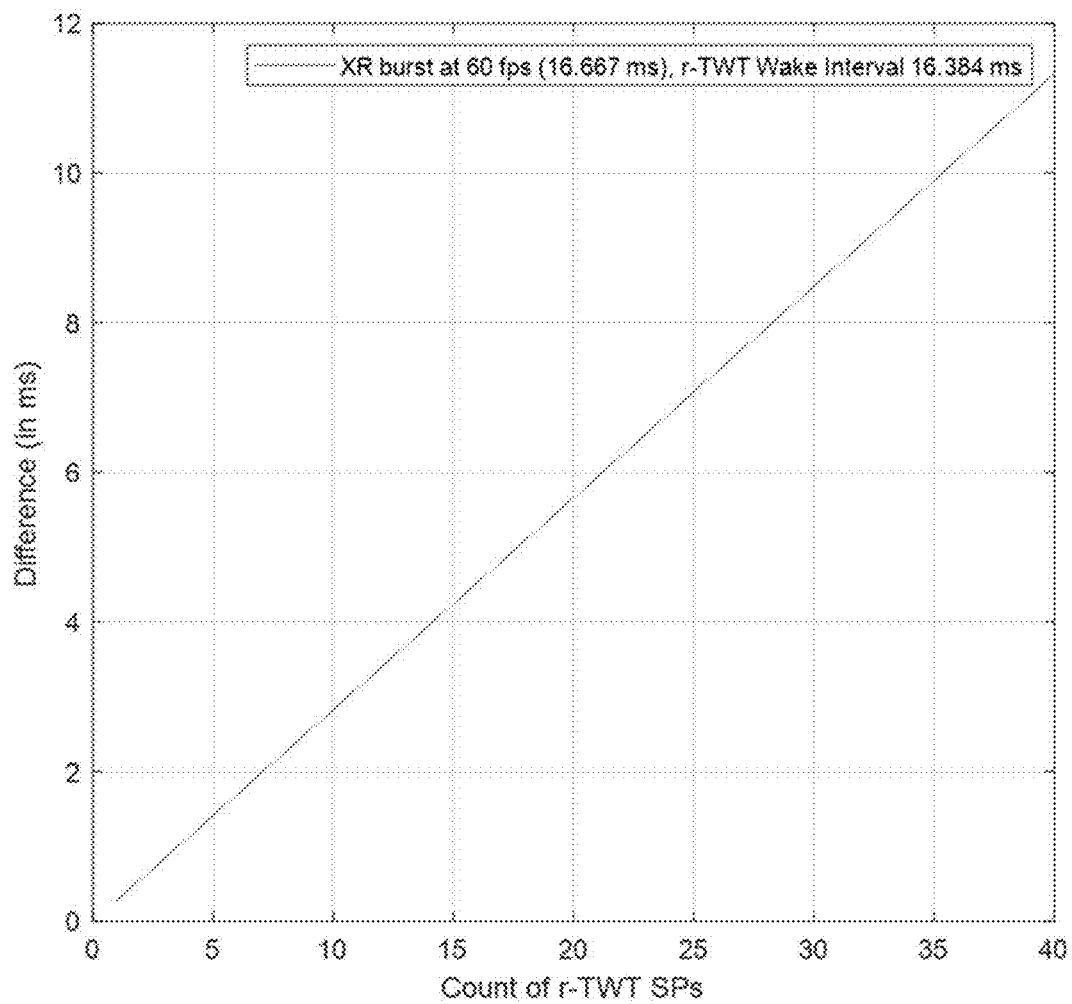
FIG. 8 illustrates an example of mismatch between the burst arrival time of latency-sensitive traffic and a TWT SP start time over a period of time.

This potential adverse impact is also shown graphically in FIG. 8, which illustrates the mismatch between the XR/CG burst arrival time and the r-TWT SP start time over a period of time (in terms of r-TWT SP count). As illustrated, the mismatch can grow up to several milliseconds after several r-TWT SPs.

To help address this issue, aspects of the present disclosure provide techniques to synchronize the latency-sensitive traffic burst arrival time with the r-TWT SPs at a sub-1024 μs level (e.g., up to 0 μs). In some cases, the granularity may be indicated to a station, providing additional flexibility in adapting TWT-SP start times to expected traffic arrival times.

Figure 9:
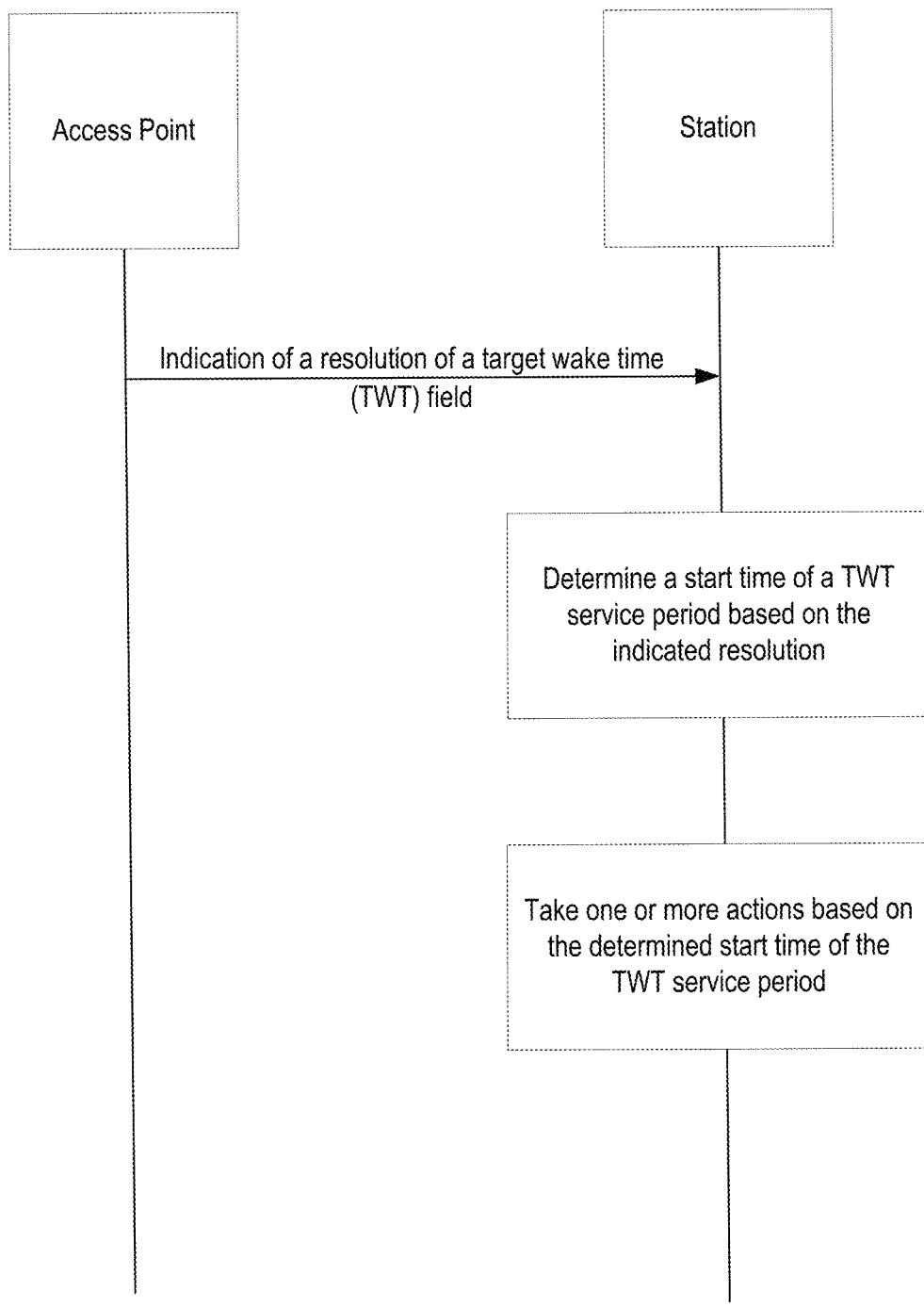
FIG. 9 is a call flow diagram illustrating example techniques for determining a start time of a TWT SP based on an indicated resolution of a TWT field, in accordance with certain aspects of the present disclosure.

The techniques presented herein, providing flexibility to specific TWT granularity, may be understood with reference to the example call flow diagram of FIG. 9. As shown in FIG. 9, a STA may obtain, from an AP, signaling indicating a resolution of a TWT field. The STA may then determine a start time of a TWT SP based on the indicated resolution, and take action based on the determined start time of the TWT SP. According to certain aspects, taking action may involve processing data during the TWT service period (e.g., if that STA is indicated and is a member of an r-TWT SP) and/or ending a transmit opportunity (TXOP) before the start time of the TWT SP.

Certain aspects of the present disclosure allow TWT SP start times to be specified with reduced granularity by redefining the TWT field encoding. Certain aspects of the present disclosure also provide techniques for extending the TWT field size to support sub-1024 μs granularity. The methods described below may also be used for Broadcast TWT (e.g., Wi-Fi 6) and coordinated r-TWT framework (e.g., Wi-Fi 8) which extends r-TWT from single basic service (BSS) scenarios to multiple BSS scenarios.

According to certain aspects, a new encoding for a target wakeup time (TWT) field may be defined as follows. The r-TWT scheduling AP may set the TWT field to certain bits of the TSF timer, designated by start (S) and end (E) bits [bit S: bit E] that corresponds to the next TWT that is scheduled for this TWT parameter set when the frame that contains the TWT element is queued for transmission. According to certain aspects, the TSF timer that corresponds to the next scheduled TWT may have bits 0 to S−1 set equal to 0 and bits E+1 to 63 set equal to the same value as the respective bits in the current TSF timer. Thus, S and E may be set to specify the granularity (resolution) with which the TWT field may set a specific TWT SP start time.

In certain aspects, the AP may indicate the type of encoding used with a reserved bit or new broadcast TWT recommendation field value in the TWT element. In certain aspects, the AP may indicate the type of encoding used with a separate element. For example, the AP may define a new Extended TWT element. In some cases, the bit S and E encoding may be signaled dynamically or in a static fashion (e.g., using a rule based on specifications for a given application).

According to certain aspects, the TWT field may be extended in the Broadcast TWT Parameter Set Field to become greater than two octets, (e.g., three to eight octets, where eight octets could match the full TSF time bits 0:63). In this case, an additional octet (or octets) towards the end of the Broadcast TWT Parameter Set Field may be used.

According to certain aspects, the AP and the STA may use an 8-octet TWT field (e.g., a full TSF) during the negotiation (e.g., in a TWT setup frame), but may use a smaller TWT field (e.g., two or three octets) in the beacon to avoid beacon bloating (by using a reduced number of bits). For certain aspects, the TWT field size may be announced every delivery traffic indication map (DTIM) beacon. In one example, a three-octet TWT field may be indicated, and a two-octet field may be used (by default) if no indication is sent. Alternatively, according to certain aspects, an r-TWT SP announcement frame may be broadcasted and include the TWT element, thereby avoiding including such an announcement in the DTIM beacon.

FIG. 10 is a table illustrating one proposed encoding scheme, where the TWT SP start time granularity is determined by the choice of Bit S and Bit E. As illustrated, setting S to 10 and E to 25 results in a TWT SP start time granularity of 1024 usec, which matches existing granularity.

As illustrated, the selection of the actual values for S and E may provide a tradeoff between closest TWT that could be scheduled and the maximum TWT that could be scheduled in the future.

Figure 11:
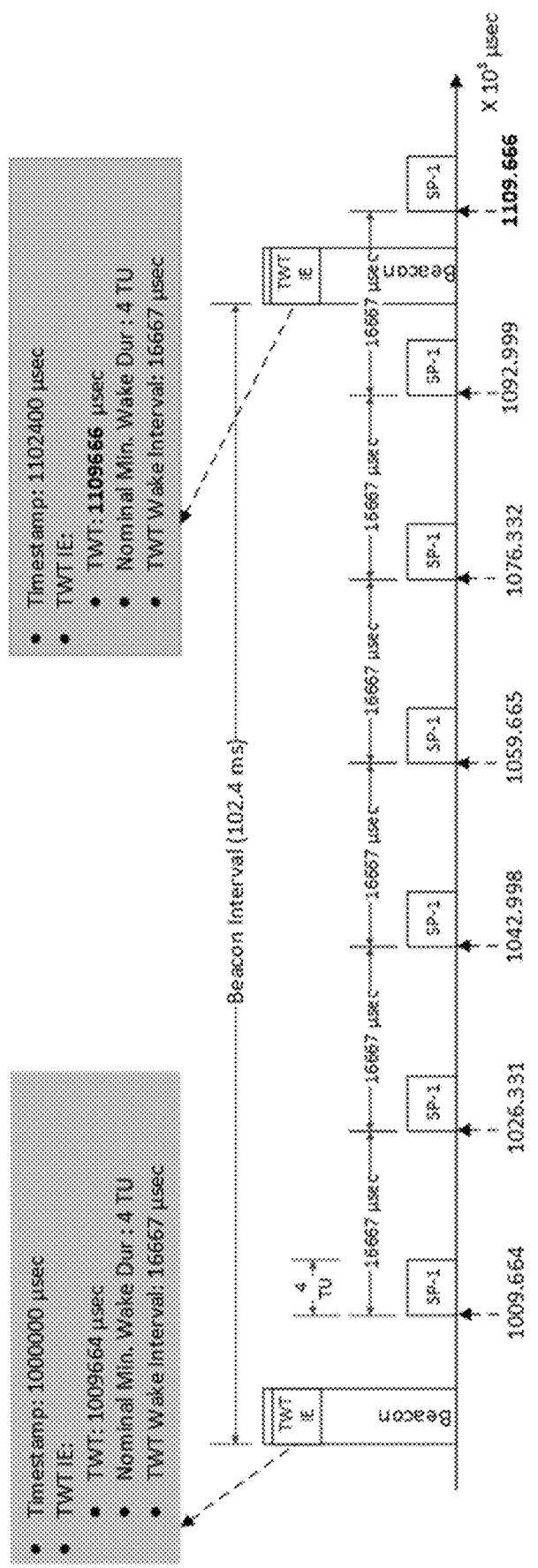
FIG. 11 depicts an example of how finer resolution for a TWT may help reduce mismatch between the burst arrival time of latency-sensitive traffic and a TWT SP start time over a period of time, in accordance with certain aspects of the present disclosure.

As illustrated in FIG. 11, the Enhanced TWT Wake Interval signaling proposed herein allows the AP to express sub-1024 μs granularity and therefore aligns traffic arrival with the TWT SP and avoids differences between negotiated and announced r-TWT SP start time or difference between the same TWT announced by neighbor APs in the coordinated r-TWT framework.

Similar to the example shown in FIG. 6, the example of FIG. 11 shows a first beacon is sent at a first time (time stamp 1000000 usec) that indicates a TWT of 1009664 usec for a TWT SP with a duration of 4 TU and a TWT wake interval of 16667 usec. In this case, however, due to the finer resolution, the TWT Wake Interval can be set to the ideal 1109666 usec to align with the subsequent burst of traffic, avoiding the mismatch resulting in the example shown in FIG. 6.

According to certain aspects, an AP may signal a sub-1024 μs precision in an extended TWT (or r-TWT) element. This signaling may be accomplished, for example, using a new (e.g., a newly defined) extended TWT element.

As illustrated in FIG. 11, such an element may be announced in the beacon along with the TWT element and may have the fields to indicate the sub-1024 μs precision of the corresponding r-TWT parameter sets. The fields of the new element may include, for example, a TWT Broadcast Identifier (ID) field with a value is set to the corresponding TWT parameter set, and an Extended Target Wake Time field, to indicate the sub-1024 μs granularity. According to certain aspects, ten bits may be used to indicate a 1 μs granularity, and the new field size may be set to two octets.

The AP may indicate using a reserved bit (e.g., a control field or a TWT Parameter Set field) in the TWT element that the additional granularity is present in the Extended TWT element so that the STA can parse that element and wake up at the intended time or terminate the TXOP before the intended start of the r-TWT SP.

In case of coordinated r-TWT, an AP may also announce the sub-1024 μs granularity that results from the TSF difference with respect to other APs using a new or existing element in addition to the corresponding Broadcast TWT IDs so that the STAs can adjust the TWT time correctly. The aspects of the present disclosure may also apply to Broadcast TWT, which is inherited by r-TWT and a Coordinated r-TWT (C-R-TWT) as an extension to r-TWT.

According to certain aspects, for coordinated r-TWT, the AP and the STA may signal the TSF offset with sub-1 TU precision in an extended (C-R-TWT element.

Certain aspects may define a new element (e.g., an extended TWT (or r-TWT) element) that is announced in the beacon along with the TWT element and that has the following fields to indicate the sub-1024 μs precision of a corresponding r-TWT parameter set. For example, one such field may be a TWT Broadcast ID field that has a value set to the corresponding TWT parameter set.

Another example field may include a full TSF offset with respect to neighboring APs and corresponding C-r-TWT parameter set (using TWT Broadcast ID). For certain aspects, this information may be included in an existing element. According to certain aspects, a new field (e.g., an Extended Target Wake Time field) may be used to indicate the sub-1024 μs granularity. The new field may use ten bits to indicate a 1 μs granularity. For certain aspects, the size of the new field may be set to two octets. In certain aspects, the new field may include the whole TWT field with sub-1024 μs granularity.

According to certain aspects, the associated AP may announce in a beacon a corrected TWT of an r-TWT SP that belongs to a friendly AP so that STAs within the BSS will end the TXOP before the start of the r-TWT SP of that AP. According to certain other aspects, the associated AP may announce in a beacon the same TWT of an r-TWT SP that belongs to a friendly AP so that STAs within the BSS correct the start time by relying on additional information (e.g., a full or partial TSF offset with sub-1024 μs granularity).

Example Operations of a Station

Figure 12:
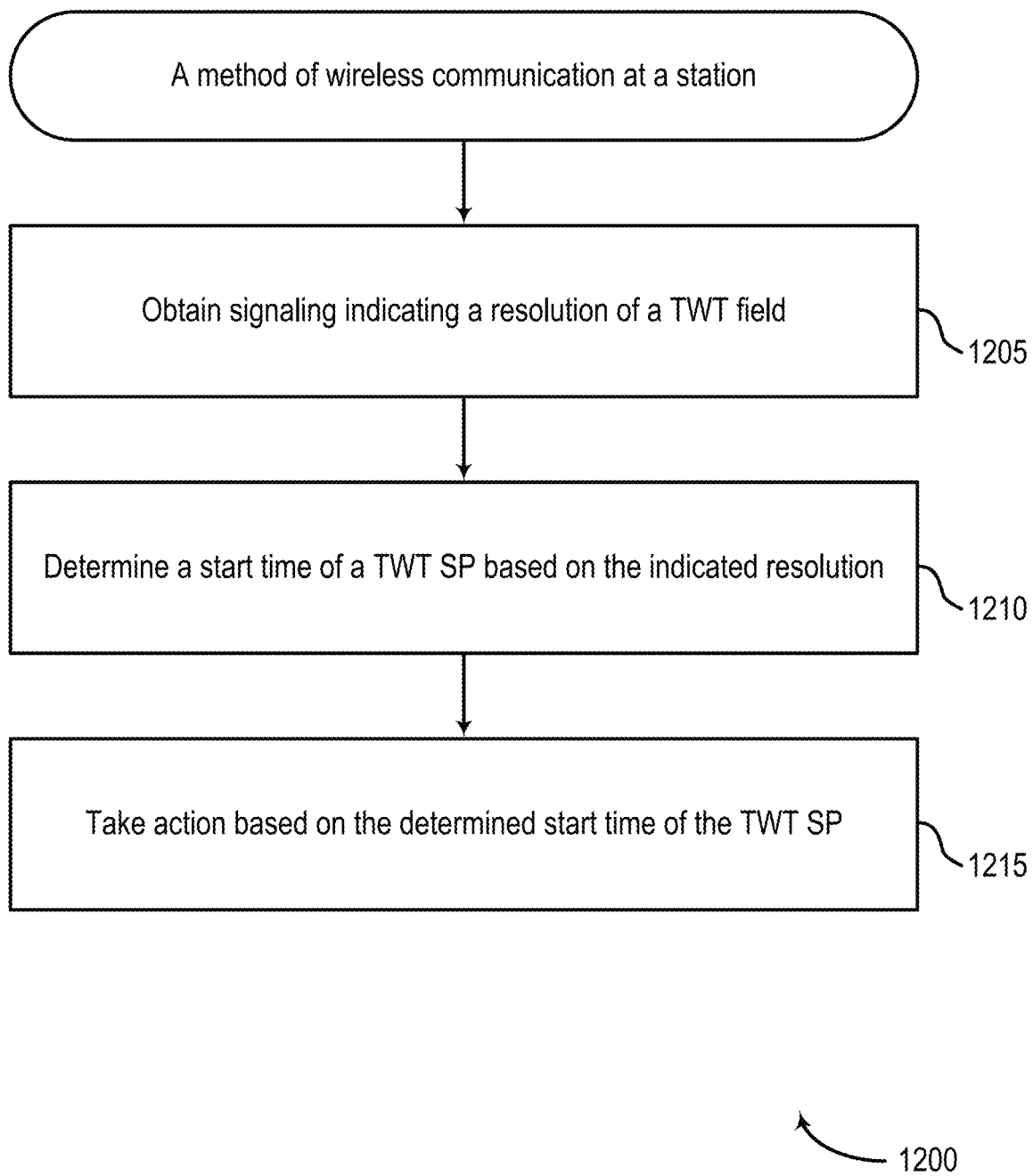
FIG. 12 depicts a method for wireless communications, in accordance with certain aspects of the present disclosure.

FIG. 12 shows a method 1200 of wireless communication at a station, such as at a STA 120 of FIGS. 1 and 2.

Method 1200 begins at step 1205 with obtaining signaling indicating a resolution of a TWT field. In some cases, the operations of this step refer to, or may be performed by, circuitry for obtaining and/or code for obtaining as described with reference to FIG. 14.

Method 1200 then proceeds to step 1210 with determining a start time of a TWT SP based on the indicated resolution. In some cases, the operations of this step refer to, or may be performed by, circuitry for determining and/or code for determining as described with reference to FIG. 14.

Method 1200 then proceeds to step 1215 with taking action based on the determined start time of the TWT SP. In some cases, the operations of this step refer to, or may be performed by, circuitry for taking and/or code for taking as described with reference to FIG. 14.

In some aspects, taking action comprises processing data during the TWT service period.

In some aspects, taking action comprises ending a TXOP before the start time of the TWT SP.

In some aspects, the resolution is indicated in one or more fields in a TWT setup frame.

In some aspects, the signaling further indicates a type of encoding used by for the TWT field.

In some aspects, the type of encoding used is indicated via a bit in the TWT field, a certain value for a field of a TWT element, or a separate IE.

In some aspects, the signaling further indicates a start bit and an end bit; and determining the start time of the TWT SP comprises determining, based on the start bit and end bit, what bits of a TWT field map to bits of a TSF timer.

In some aspects, the method 1200 further includes determining the start bit and the end bit based on at least one of: dynamic signaling or a rule. In some cases, the operations of this step refer to, or may be performed by, circuitry for determining and/or code for determining as described with reference to FIG. 14.

In some aspects, the start bit and the end bit are determined based on an application associated with the station.

In some aspects, the signaling comprises an extended TWT field.

In some aspects, the resolution is indicated by the extended TWT field, and wherein the extended TWT field further indicates the resolution as less than 1024 microseconds.

In some aspects, the method 1200 further includes detecting a presence of the extended TWT field based on one more bits in a TWT element. In some cases, the operations of this step refer to, or may be performed by, circuitry for detecting and/or code for detecting as described with reference to FIG. 14.

In some aspects, the signaling comprises a Broadcast TWT ID that indicates a TWT parameter set to which the resolution applies.

In some aspects, the signaling comprises a TSF offset with respect to one or more neighboring APs, said TSF offset indicating the resolution.

Figure 14:
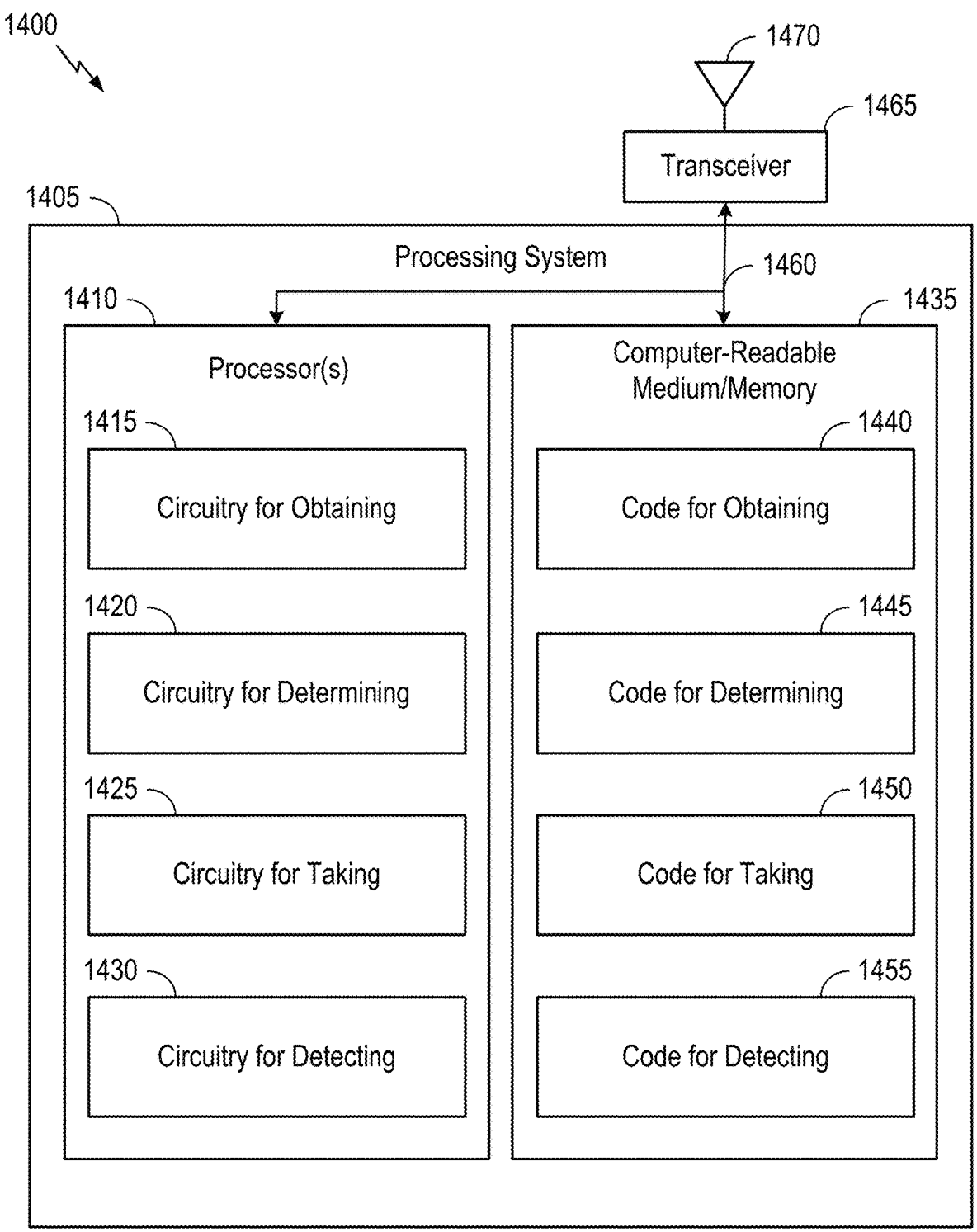
FIG. 14 depicts aspects of an example communications device, in accordance with certain aspects of the present disclosure.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Operations of an Access Point

Figure 13:
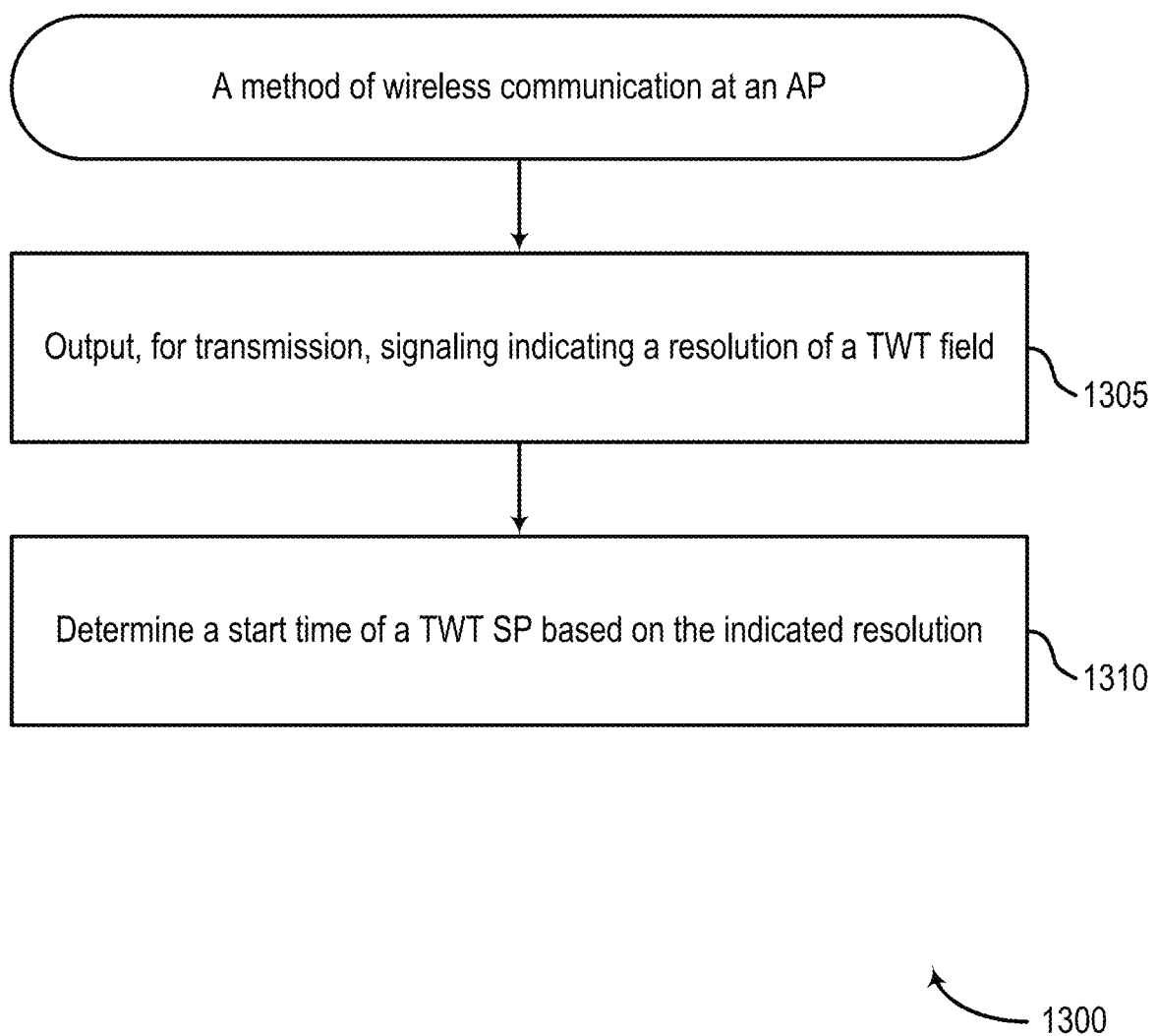
FIG. 13 depicts a method for wireless communications, in accordance with certain aspects of the present disclosure.

FIG. 13 shows a method 1300 of wireless communication at an AP, such as at an AP 110 of FIGS. 1 and 2.

Method 1300 begins at step 1305 with outputting, for transmission, signaling indicating a resolution of a TWT field. In some cases, the operations of this step refer to, or may be performed by, circuitry for outputting and/or code for outputting as described with reference to FIG. 15.

Method 1300 then proceeds to step 1310 with determining a start time of a TWT SP based on the indicated resolution. In some cases, the operations of this step refer to, or may be performed by, circuitry for determining and/or code for determining as described with reference to FIG. 15.

In some aspects, the resolution is indicated in one or more fields in a TWT setup frame.

In some aspects, the signaling further indicates a type of encoding used by for the TWT field.

In some aspects, the type of encoding used is indicated via a bit in the TWT field, a certain value for a field of a TWT element, or a separate IE.

In some aspects, the method 1300 further includes outputting for transmission dynamic signaling indicating the start bit and the end bit. In some cases, the operations of this step refer to, or may be performed by, circuitry for outputting and/or code for outputting as described with reference to FIG. 15.

In some aspects, the start bit and the end bit are determined based on an application associated with the station.

In some aspects, the signaling further indicates a start bit and an end bit; and determining the start time of the TWT SP comprises determining, based on the start bit and end bit, what bits of a TWT field map to bits of a TSF timer.

In some aspects, the signaling comprises an extended TWT field.

In some aspects, the resolution is indicated by the extended TWT field, and wherein the extended TWT field further indicates the resolution as less than 1024 microseconds.

In some aspects, the method 1300 further includes indicating a presence of the extended TWT field based on one more bits in a TWT element. In some cases, the operations of this step refer to, or may be performed by, circuitry for indicating and/or code for indicating as described with reference to FIG. 15.

In some aspects, the signaling comprises a Broadcast TWT ID that indicates a TWT parameter set to which the resolution applies.

In some aspects, the signaling comprises a TSF offset with respect to one or more neighboring APs, said TSF offset indicating the resolution.

Figure 15:
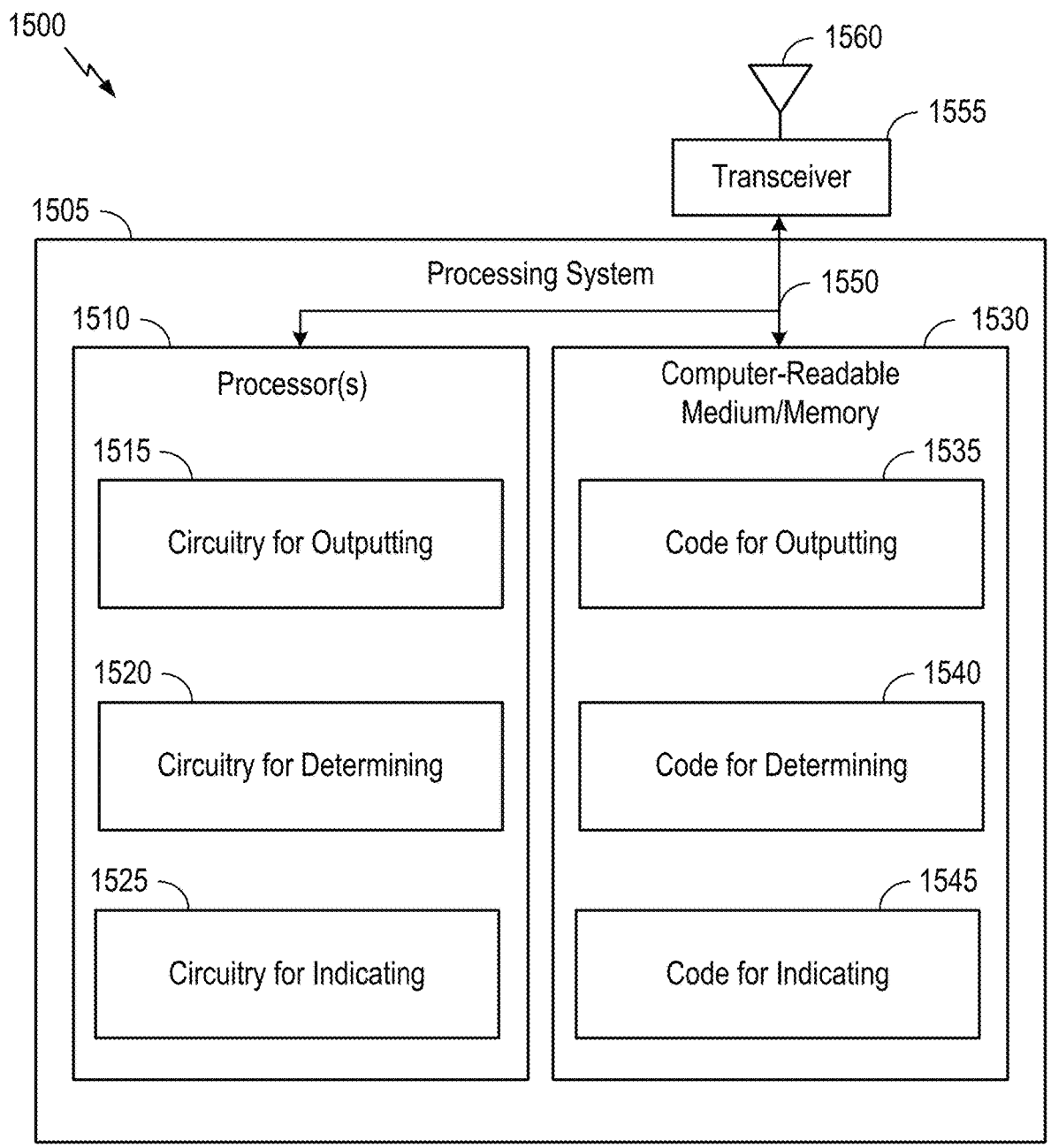
FIG. 15 depicts aspects of an example communications device, in accordance with certain aspects of the present disclosure.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a station, such as a STA 120 described above with respect to FIGS. 1 and 2.

The communications device 1400 includes a processing system 1405 coupled to the transceiver 1465 (e.g., a transmitter and/or a receiver). The transceiver 1465 is configured to transmit and receive signals for the communications device 1400 via the antenna 1470, such as the various signals as described herein. Transceiver 1465 may be an example of aspects of the transceiver 254 described with reference to FIG. 2. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of the RX data processor 270, the TX data processor 288, the TX spatial processor 290, or the controller 280 of STA 120 illustrated in FIG. 2. The one or more processors 1410 are coupled to a computer-readable medium/memory 1435 via a bus 1460. In certain aspects, the computer-readable medium/memory 1435 is configured to store instructions (e.g., computer-executable code) that when executed by the one or more processors 1410, cause the one or more processors 1410 to perform the method 1200 described with respect to FIG. 12, or any aspect related to it. Note that reference to a processor performing a function of communications device 1400 may include one or more processors 1410 performing that function of communications device 1400.

In the depicted example, computer-readable medium/memory 1435 stores code (e.g., executable instructions), such as code for obtaining 1440, code for determining 1445, code for taking 1450, and code for detecting 1455. Processing of the code for obtaining 1440, code for determining 1445, code for taking 1450, and code for detecting 1455 may cause the communications device 1400 to perform the method 1200 described with respect to FIG. 12, or any aspect related to it.

The one or more processors 1410 include circuitry configured to implement (e.g., execute) the code stored in the computer-readable medium/memory 1435, including circuitry such as circuitry for obtaining 1415, circuitry for determining 1420, circuitry for taking 1425, and circuitry for detecting 1430. Processing with circuitry for obtaining 1415, circuitry for determining 1420, circuitry for taking 1425, and circuitry for detecting 1430 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include the transmitter unit 254 or antenna(s) 252 of the STA 120 illustrated in FIG. 2 and/or the transceiver 1465 and the antenna 1470 of the communications device 1400 in FIG. 14. Means for receiving or obtaining may include the receiver unit 254 or antenna(s) 252 of STA 120 illustrated in FIG. 2 and/or the transceiver 1465 and the antenna 1470 of the communications device 1400 in FIG. 14.

FIG. 15 depicts aspects of an example communications device 1500. In some aspects, communications device 1500 is an AP, such as an AP 110 described above with respect to FIGS. 1 and 2.

The communications device 1500 includes a processing system 1505 coupled to the transceiver 1555 (e.g., a transmitter and/or a receiver). The transceiver 1555 is configured to transmit and receive signals for the communications device 1500 via the antenna 1560, such as the various signals as described herein. Transceiver 1555 may be an example of aspects of the transceiver 254 described with reference to FIG. 2. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of RX data processor 242, the TX data processor 210, the TX spatial processor 220, or the controller 230 of AP 110 illustrated in FIG. 2. The one or more processors 1510 are coupled to a computer-readable medium/memory 1530 via a bus 1550. In certain aspects, the computer-readable medium/memory 1530 is configured to store instructions (e.g., computer-executable code) that when executed by the one or more processors 1510, cause the one or more processors 1510 to perform the method 1300 described with respect to FIG. 13, or any aspect related to it. Note that reference to a processor performing a function of communications device 1500 may include one or more processors 1510 performing that function of communications device 1500.

In the depicted example, computer-readable medium/ memory 1530 stores code (e.g., executable instructions), such as code for outputting 1535, code for determining 1540, and code for indicating 1545. Processing of the code for outputting 1535, code for determining 1540, and code for indicating 1545 may cause the communications device 1500 to perform the method 1300 described with respect to FIG. 13, or any aspect related to it.

The one or more processors 1510 include circuitry configured to implement (e.g., execute) the code stored in the computer-readable medium/memory 1530, including circuitry such as circuitry for outputting 1515, circuitry for determining 1520, and circuitry for indicating 1525. Processing with circuitry for outputting 1515, circuitry for determining 1520, and circuitry for indicating 1525 may cause the communications device 1500 to perform the method 1300 described with respect to FIG. 13, or any aspect related to it.

Various components of the communications device 1500 may provide means for performing the method 1300 described with respect to FIG. 13, or any aspect related to it. For example, means for transmitting, sending or outputting for transmission may include the transmitter unit 222 or an antenna(s) 224 of AP 110 illustrated in FIG. 2 and/or the transceiver 1555 and the antenna 1560 of the communications device 1500 in FIG. 15. Means for receiving or obtaining may include the receiver unit 222 or an antenna(s) 224 of AP 110 illustrated in FIG. 2 and/or the transceiver 1555 and the antenna 1560 of the communications device 1500 in FIG. 15. Means for communicating may include the transmitter/receiver unit 222 or an antenna(s) 224 of AP 110 illustrated in FIG. 2 and/or the transceiver 1555 and the antenna 1560 of the communications device 1500 in FIG. 15. Means for determining, means for taking action, and means for detecting may include one or more of the processors illustrated in FIG. 2.

Example Clauses

Implementation examples are described in the following numbered clauses:

Clause 1: A method of wireless communication at a station, comprising: obtaining signaling indicating a resolution of a TWT field; determining a start time of a TWT SP based on the indicated resolution; and taking action based on the determined start time of the TWT SP.

Clause 2: The method of Clause 1, wherein taking action comprises processing data during the TWT service period.

Clause 3: The method of any one of Clauses 1 and 2, wherein taking action comprises ending a TXOP before the start time of the TWT SP.

Clause 4: The method of any one of Clauses 1-3, wherein the resolution is indicated in one or more fields in a TWT setup frame.

Clause 5: The method of any one of Clauses 1-4, wherein the signaling further indicates a type of encoding used by for the TWT field.

Clause 6: The method of Clause 5, wherein the type of encoding used is indicated via a bit in the TWT field, a certain value for a field of a TWT element, or a separate IE.

Clause 7: The method of any one of Clauses 1-6, wherein: the signaling further indicates a start bit and an end bit; and determining the start time of the TWT SP comprises determining, based on the start bit and end bit, what bits of a TWT field map to bits of a TSF timer.

Clause 8: The method of Clause 7, further comprising: determining the start bit and the end bit based on at least one of: dynamic signaling or a rule.

Clause 9: The method of Clause 7, wherein the start bit and the end bit are determined based on an application associated with the station.

Clause 10: The method of any one of Clauses 1-9, wherein the signaling comprises an extended TWT field.

Clause 11: The method of Clause 10, wherein the resolution is indicated by the extended TWT field, and wherein the extended TWT field further indicates the resolution as less than 1024 micro-seconds.

Clause 12: The method of Clause 11, further comprising: detecting a presence of the extended TWT field based on one more bits in a TWT element.

Clause 13: The method of any one of Clauses 1-12, wherein the signaling comprises a Broadcast TWT ID that indicates a TWT parameter set to which the resolution applies.

Clause 14: The method of any one of Clauses 1-13, wherein the signaling comprises a TSF offset with respect to one or more neighboring APs, said TSF offset indicating the resolution.

Clause 15: A method of wireless communication at an AP, comprising: outputting, for transmission, signaling indicating a resolution of a TWT field; and determining a start time of a TWT SP based on the indicated resolution.

Clause 16: The method of Clause 15, wherein the resolution is indicated in one or more fields in a TWT setup frame.

Clause 17: The method of any one of Clauses 15 and 16, wherein the signaling further indicates a type of encoding used by for the TWT field.

Clause 18: The method of Clause 17, wherein the type of encoding used is indicated via a bit in the TWT field, a certain value for a field of a TWT element, or a separate IE.

Clause 19: The method of Clause 18, further comprising: outputting for transmission dynamic signaling indicating the start bit and the end bit.

Clause 20: The method of Clause 18, wherein the start bit and the end bit are determined based on an application associated with the station.

Clause 21: The method of any one of Clauses 15-20, wherein: the signaling further indicates a start bit and an end bit; and determining the start time of the TWT SP comprises determining, based on the start bit and end bit, what bits of a TWT field map to bits of a TSF timer.

Clause 22: The method of any one of Clauses 15-21, wherein the signaling comprises an extended TWT field.

Clause 23: The method of Clause 22, wherein the resolution is indicated by the extended TWT field, and wherein the extended TWT field further indicates the resolution as less than 1024 micro-seconds.

Clause 24: The method of Clause 23, further comprising: indicating a presence of the extended TWT field based on one more bits in a TWT element.

Clause 25: The method of any one of Clauses 15-24, wherein the signaling comprises a Broadcast TWT ID that indicates a TWT parameter set to which the resolution applies.

Clause 26: The method of any one of Clauses 15-25, wherein the signaling comprises a TSF offset with respect to one or more neighboring APs, said TSF offset indicating the resolution.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Clause 31: A station, comprising: at least one transceiver; a memory comprising instructions; and one or more processors configured to execute the instructions and cause the station to perform a method in accordance with any one of Clauses 1-14, wherein the at least one transceiver is configured to receive the signaling.

Clause 32: An access point, comprising: at least one transceiver; a memory comprising instructions; and one or more processors configured to execute the instructions and cause the access point to perform a method in accordance with any one of Clauses 15-26, wherein the at least one transceiver is configured to transmit the signaling.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "communicating" broadly encompasses a variety of signaling between devices. Communicating may include one or both of receiving (or obtaining) or transmitting (outputting for transmission).

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus comprising: memory comprising processor-executable instructions; and one or more processors configured, individually or collectively, to execute the processor-executable instructions and cause the apparatus to:

obtain signaling indicating a resolution of a target wake time (TWT) field and a type of encoding used by the TWT field; and take action upon identifying a start time of a TWT service period (SP), the start time of the TWT SP identified in accordance with based on the indicated resolution.

2. The apparatus of claim 1, wherein taking action comprises processing data during the TWT service period.

3. The apparatus of claim 1, wherein taking action comprises ending a transmit opportunity (TXOP) before the start time of the TWT SP.

4. The apparatus of claim 1, wherein the resolution is indicated in one or more fields in a TWT setup frame.

5. The apparatus of claim 1, wherein the type of encoding used is indicated via a bit in the TWT field, a certain value for a field of a TWT element, or a separate information element (IE).

6. The apparatus of claim 1, wherein:
the signaling further indicates a start bit and an end bit; and
determining the start time of the TWT SP comprises determining, based on the start bit and end bit, what bits of a TWT field map to bits of a timing and synchronization function (TSF) timer.

7. The apparatus of claim 6, wherein the one or more processors are configured, individually or collectively, to execute the processor-executable instructions and cause the apparatus to determine the start bit and the end bit based on at least one of: dynamic signaling or a rule.

8. The apparatus of claim 6, wherein the start bit and the end bit are determined based on an application associated with the apparatus.

9. The apparatus of claim 1, wherein the signaling comprises an extended TWT field.

10. The apparatus of claim 9, wherein the resolution is indicated by the extended TWT field, and wherein the extended TWT field further indicates the resolution as less than 1024 micro-seconds.

11. The apparatus of claim 10, wherein the one or more processors are configured, individually or collectively, to execute the processor-executable instructions and cause the apparatus to detect a presence of the extended TWT field based on one more bits in a TWT element.

12. The apparatus of claim 1, wherein the signaling comprises a Broadcast TWT ID that indicates a TWT parameter set to which the resolution applies.

13. The apparatus of claim 1, further comprising at least one transceiver configured to receive the signaling, wherein the apparatus is configured as a station.

14. The apparatus of claim 1, wherein a resolution of the TWT is determined by the type of encoding.

15. An apparatus, comprising: memory comprising processor-executable instructions; and one or more processors configured, individually or collectively, to execute the processor-executable instructions and cause the apparatus to:
output, for transmission, signaling indicating a resolution of a target wake time (TWT) field and a type of encoding used by the TWT field;
upon identifying a start time of a TWT service period (SP) in accordance with the indicated resolution,
communicate with one or more stations, during the TWT SP, in accordance with the start time.

16. The apparatus of claim 15, wherein the resolution is indicated in one or more fields in a TWT setup frame.

17. The apparatus of claim 15, wherein the type of encoding used is indicated via a bit in the TWT field, a certain value for a field of a TWT element, or a separate information element (IE).

18. The apparatus of claim 15, wherein:
the signaling further indicates a start bit and an end bit; and
determining the start time of the TWT SP comprises determining, based on the start bit and end bit, what bits of a TWT field map to bits of a timing and synchronization function (TSF) timer.

19. The apparatus of claim 18, wherein the one or more processors are configured, individually or collectively, to execute the processor-executable instructions and cause the apparatus to output for transmission dynamic signaling indicating the start bit and the end bit.

20. The apparatus of claim 18, wherein the start bit and the end bit are determined based on an application associated with the apparatus.

21. The apparatus of claim 15, wherein the signaling comprises an extended TWT field.

22. The apparatus of claim 21, wherein the resolution is indicated by the extended TWT field, and wherein the extended TWT field further indicates the resolution as less than 1024 micro-seconds.

23. The apparatus of claim 22, wherein the one or more processors are configured, individually or collectively, to execute the processor-executable instructions and cause the apparatus to indicate a presence of the extended TWT field based on one more bits in a TWT element.

24. The apparatus of claim 15, wherein the signaling comprises a Broadcast TWT ID that indicates a TWT parameter set to which the resolution applies.

25. The apparatus of claim 15, further comprising at least one transceiver configured to transmit the signaling, wherein the apparatus is configured as an access point.

26. The apparatus of claim 15, wherein the type of encoding is associated with a granularity of the start time of the TWT SP.

27. A method of wireless communication at a station, comprising:
obtaining signaling indicating a resolution of a target wake time (TWT) field and a type of encoding used by the TWT field; and
taking action upon identifying a start time of a TWT service period (SP), the start time of the TWT SP identified in accordance with based on the indicated resolution.

28. A method of wireless communication at an access point (AP), comprising:
outputting, for transmission, signaling indicating a resolution of a target wake time (TWT) field and a type of encoding used by the TWT field;
upon identifying a start time of a TWT service period (SP) in accordance with the indicated resolution,
communicating with one or more stations, during the TWT SP, in accordance with the start time.

* * * * *